(12) United States Patent
Fujita (10) Patent No.: US 7,088,479 B2
(45) Date of Patent: Aug. 8, 2006

(54) IMAGE PROCESSING APPARATUS FOR ELECTROPHOTOGRAPHY AND ELECTROPHOTOGRAPHIC APPARATUS UTILIZING THE SAME

(75) Inventor: Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 988 days.

(21) Appl. No.: 09/741,099

(22) Filed: Dec. 21, 2000

(65) Prior Publication Data
US 2001/0024302 A1 Sep. 27, 2001

(30) Foreign Application Priority Data
Dec. 22, 1999 (JP) .............................. P. 11-365499
Sep. 4, 2000 (JP) ......................... P. 2000-266897

(51) Int. Cl.
*H04N 1/46* (2006.01)

(52) U.S. Cl. ...................... 358/536; 358/519; 358/518; 358/534; 358/525; 358/530; 358/523; 382/167; 347/131; 345/596; 345/89

(58) Field of Classification Search ................ 358/519, 358/518, 521, 534, 535, 536, 1.9, 530, 448, 358/1.1, 442, 406, 525, 523; 382/167, 260, 382/270; 430/31; 347/131
See application file for complete search history.

(56) References Cited

U.S. PATENT DOCUMENTS

| 4,402,015 | A | * | 8/1983 | Yamada ...................... 358/448 |
| 4,899,215 | A | * | 2/1990 | Morita et al. ................ 358/518 |
| 5,018,085 | A |   | 5/1991 | Smith, Jr. |
| 5,253,082 | A | * | 10/1993 | Hayashi et al. .............. 358/1.9 |
| 5,258,248 | A | * | 11/1993 | Tokuhashi et al. ............. 430/31 |
| 5,345,315 | A | * | 9/1994 | Shalit ......................... 358/406 |
| 5,357,354 | A | * | 10/1994 | Matsunawa et al. ........ 358/530 |
| 5,563,725 | A | * | 10/1996 | Kumada et al. ............ 358/518 |

(Continued)

FOREIGN PATENT DOCUMENTS

EP 0 938 041 A2 8/1999

(Continued)

OTHER PUBLICATIONS

Japanese Abstract No. 08032828, dated Feb. 2, 1996.

*Primary Examiner*—Mark Wallerson
*Assistant Examiner*—Beniyam Menberu
(74) *Attorney, Agent, or Firm*—Sughrue Mion, PLLC (57) ABSTRACT

An image processing apparatus, which performs color conversion for input tone data in an RGB color space to obtain tone data for a CMY color space, and which performs halftone processing to convert the tone data in the CMY color space to image reproduction data, is characterized in that a gamma characteristic A for an output density for a tone in the RGB color space is identical to a gamma characteristic B for an output density for a tone in the CMY color space in the halftone processing. In accordance with the invention, for the color conversion, even when the tone data for the RGB color space between the grid points of a color conversion table is obtained by interpolating the tone data for the CMY color space, the halftone process is performed for the RGB tone data in accordance with the same gamma characteristic B. Thus, image reproduction data can be obtained that provide the same output density as the output density allocated for the tone data of the RGB color space. Therefore, when the image reproduction data are employed for printing, the colors of an image can be accurately reproduced, as designed, and a high quality image can be printed.

19 Claims, 9 Drawing Sheets

U.S. PATENT DOCUMENTS

| | | | | |
|---|---|---|---|---|
| 5,568,572 | A | * | 10/1996 | Shu .......................... 382/260 |
| 5,610,726 | A | * | 3/1997 | Nonoshita et al. .......... 358/442 |
| 5,636,290 | A | * | 6/1997 | Kita et al. .................. 382/167 |
| 5,712,930 | A | * | 1/1998 | Watanabe .................. 382/270 |
| 5,828,397 | A | * | 10/1998 | Goto et al. ................. 347/131 |
| 5,900,952 | A | | 5/1999 | Fan |
| 5,982,990 | A | * | 11/1999 | Gondek ....................... 358/1.9 |
| 6,075,614 | A | * | 6/2000 | Ohtsuka et al. .............. 358/1.1 |
| 6,111,664 | A | * | 8/2000 | Aoki et al. .................. 358/448 |
| 6,388,768 | B1 | * | 5/2002 | Hada et al. .................. 358/1.9 |
| 6,519,054 | B1 | * | 2/2003 | Ikeda et al. ................. 358/1.9 |
| 6,697,167 | B1 | * | 2/2004 | Takahashi ................... 358/1.9 |
| 6,831,755 | B1 | * | 12/2004 | Narushima et al. .......... 358/1.9 |

FOREIGN PATENT DOCUMENTS

| | | |
|---|---|---|
| EP | 0 945 780 A2 | 9/1999 |
| JP | 7-79356 | 3/1995 |
| JP | 7-191649 | 7/1995 |
| JP | 10-164383 | 6/1998 |
| JP | 10-276341 | 10/1998 |
| JP | 11-314408 | 11/1999 |
| JP | 2000-333012 | 11/2000 |

* cited by examiner

FIG. 2

21: PATTERN MATRIX

| 7 | 5 | 3 | 8 |
|---|---|---|---|
| 3 | 1 | 1 | 6 |
| 5 | 1 | 2 | 4 |
| 7 | 2 | 6 | 8 |
|   | 4 |   |   |

EXAMPLE HALFTONE TABLE

22: INDEX TABLE (A TONE FOR A PATTERN RELATIVE TO PULSE WIDTH)

| TONE | 1 | 2 | 3 | 4 | 5 | 6 | 7 | 8 |
|---|---|---|---|---|---|---|---|---|
| 0~63 | 0~255 | 0~255 | 0~0 | 0~0 | 0~0 | 0~0 | 0~0 | 0~0 |
| 64~127 | 255~255 | 255~255 | 0~255 | 0~255 | 0~0 | 0~0 | 0~0 | 0~0 |
| 128~191 | 255~255 | 255~255 | 255~255 | 255~255 | 0~255 | 0~255 | 0~0 | 0~0 |
| 192~255 | 255~255 | 255~255 | 255~255 | 255~255 | 255~255 | 255~255 | 0~255 | 0~255 |

S64: INPUT DATA (TONE DATA)

| $P_{00}$ | $P_{01}$ | $P_{02}$ | $P_{03}$ |
|---|---|---|---|
| $P_{10}$ | $P_{11}$ | $P_{12}$ | $P_{13}$ |
| $P_{20}$ | $P_{21}$ | $P_{22}$ | $P_{23}$ |
| $P_{30}$ | $P_{31}$ | $P_{32}$ | $P_{33}$ |

FIG. 3

CONVERSION TABLES FOR A CONVENTIONAL COLOR CONVERTER AND A HALFTONE PROCESSOR

FIG. 4

FIG. 5
OVERALL CONFIGURATION OF AN ELECTROPHOTOGRAPHIC SYSTEM

FIG. 6

WHEN RGB IS USED FOR LCD

FIG. 8

WHEN CIELab IS USED

IMAGE PROCESSING APPARATUS FOR ELECTROPHOTOGRAPHY AND ELECTROPHOTOGRAPHIC APPARATUS UTILIZING THE SAME

BACKGROUND OF THE INVENTION

1. Field of the Invention

The present invention relates to an image processing apparatus and to an electrophotographic apparatus, such as a printer or a copier, that uses such an image processing apparatus, and relates in particular to an information processing apparatus, for converting into CMYK image data RGB image data that are optimized, for the characteristic of a display device, and for performing halftone processing to generate image reproduction data, and to an electrophotographic apparatus that uses this image processing apparatus. Either this, or the present invention relates to an image processing apparatus, for converting, for a first color space, image data that are optimized for a predetermined characteristic, which is not device dependent, to obtain image data for the color space for a toner used for an electrophotographic apparatus and for performing halftone processing by generating image reproduction data for expressing image halftones, and to an electrophotographic apparatus that uses this image processing apparatus.

The present application is based on Japanese Patent Applications No. Hei. 11-365499 and 2000-266897, which are incorporated herein by reference.

2. Description of the Related Art

To generate an image using computer graphics, an image is designed on the screen of a computer and RGB image data are generated. The RGB image data are tone data for pixels for individual colors, and the image is printed by an electrophotographic apparatus, such as a printer. The electrophotographic apparatus performs color conversion for the RGB image data to obtain CMYK image data that match a print engine and halftone processing to convert the thus obtained CMYK image data into image reproduction data for individual pixels. The image reproduction data are then supplied to the print engine, which uses a laser beam for printing.

A color electrophotographic apparatus employs CMYK toner, obtained by adding K (black) to CMY, but K (black) can also be provided by mixing together the CMY colors. Therefore, or a specific electrophotographic apparatus, the general rule, even in a CMY color space, is for image data to be generated for a CMYK color space, and the thus obtained image data used for printing. Therefore, the more generally applicatory CMYK color spaces are employed in the explanation given for this specification, and thus, again for this specification, the CMYK color space concept includes that for a CMY color space, which is substantially the same.

For a page printer that uses a laser beam, the image reproduction data are drive pulse width data that specify for a pixel a beam irradiation area, and a drive pulse for driving a laser beam is generated in accordance with the image reproduction data.

In the above color conversion, three-dimensional RGB data are converted into four-dimensional CMYK data (or three-dimensional CMY data). Normally, this color conversion process is performed by using a color conversion table that discretely represents the relationship between the RGB tone data and the CMYK tone data. But when included in the tone data are data for 256 tones for each of the RGB colors, an enormous amount of data (64 Mbytes) is required for combinations of CMYK tone data relative to combinations of RGB tone data, $256^3=16700000$ colors, and it is not realistic for all the CMYK tone data combinations to be listed in a color conversion table. Therefore, normally, for several hundreds to several tens of hundreds of colors selected from $256^3=16700000$ colors, the conversion values for grid points are included in a color conversion table, and intervals between the grid points are interpolated to obtain CMY conversion values. For this process, linear interpolation is generally employed.

A multi-level dithering method, which is a binary method for tone reproduction of a density modulated image, is widely employed for the halftone process. According to the multi-level dithering method, a halftone table (gamma table), which represents the correlation of tone data and image reproduction data, is examined to extract the tone data for individual CMYK colors, which are input signals, and a dot area, an area in a pixel to which toner is attached, is determined. This dot area is an area into which a laser beam for the attachment of toner is projected, and is designated by the image reproduction data (drive pulse width data). For a cell consisting of a plurality of adjacent pixels, these dots are used to form halftone spots in the cell, and the halftone of the density modulated image is reproduced in accordance with the sizes of the halftone spots.

The halftone table (gamma table), which is a conventional halftone conversion table, is used to convert the tone data for the individual CMYK colors to image reproduction data (drive pulse width data) that correspond to the optical densities obtained through printing. This conversion characteristic is generally a linear characteristic wherein, relative to the CMYK tone data, the drive pulse width is simply increased.

Figure 9:
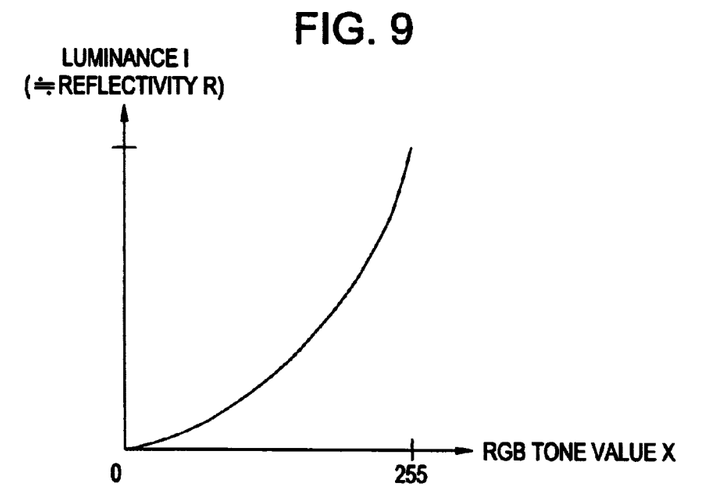
FIG. 9 is a characteristic graph showing the relationship between RGB image data x and an output luminance I on a display screen.

However, the output density of the monitor screen of a computer, e.g., a CRT screen, has a specific gamma characteristic relative to the RGB tone data. For example, FIG. 9 is a graph showing a characteristic that represents the relationship between RGB tone data x, for the CRT screen, and an output luminance I, on the display screen. According to this example, the ratio of the change in the luminance I to the change in the tone x is small in an area wherein the tone value corresponding to a dark image is low, and is large in an area wherein the tone value corresponding to a bright image is high. That is, $I=kx^n$ (n is normally 1.8 to 2.2).

The electrophotographic apparatus, such as a printer, outputs printed paper material. The luminance I, when the printed material is observed, is proportional to reflectivity R ($I=k'R$) of the printed material, and thus, $R=kx^n$. The output density (optical density) D of the printed material is defined relative to the reflectivity R to establish the relationship $D=-\log_{10}R$.

Figure 10:
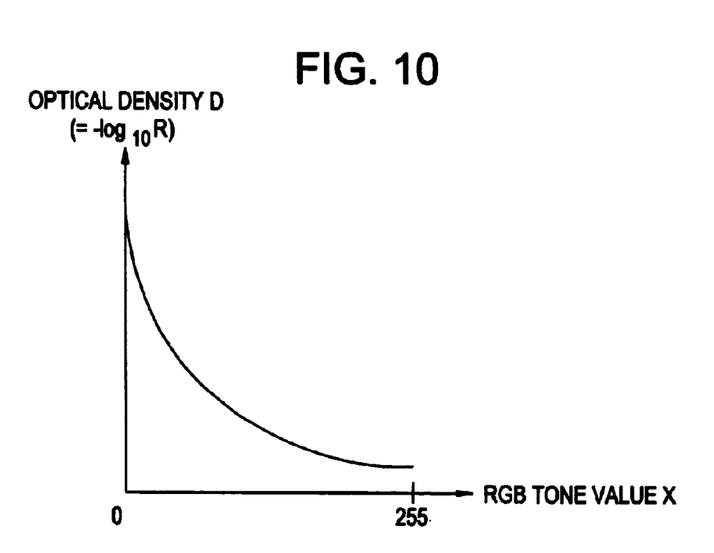
FIG. 10 is a characteristic graph showing the relationship between a RGB tone value x and an output density D for printed material.

FIG. 10 is a graph showing the characteristic that represents, according to the above equation, the relationship between the RGB tone value x on the monitor screen and the output density D of the printed material. According to this graph, the ratio of the change in the output density D to the change in the tone value x is large in an area wherein an input tone value x is low, and is small in an area wherein an input tone value x is high.

Therefore, since RGB tone data having the characteristic curve in FIG. 10 and linear conversion characteristic in the halftone processing are employed, the following problems have arisen. That is, in the color conversion, when the RGB tone data between the grid points are linearly interpolated to obtain CMYK tone data, and when the CMYK tone data are converted into image reproduction data (drive pulse width data) using the halftone process, the obtained image production data correspond to an output density that differs from an output density D (target reproduction density) for the RGB tone data shown in FIG. 10. This means that the output density of the image printed by the electrophotographic apparatus differs from the density that corresponds to the luminance of an image that is designed on the CRT screen of a computer. This is not preferable because the image on the CRT screen differs from the printed image and the image quality is deteriorated.

The above problem also arises with an electrophotographic apparatus that regards as an image RGB image data that are defined on a liquid crystal display and that employ CMYK ink. Similarly, a like problem has arisen with an electrophotographic apparatus that accepts as an input image sRGB image data defined by Windows®, CMYK image data generated by a printer, or CIELab or CIEXYZ image data constituting a color space (Device Independent Color Space) that, by using a color management module, is not device dependent, and that converts image data for the color space for a different ink.

SUMMARY OF THE INVENTION

It is, therefore, one objective of the present invention to provide for an electrophotographic apparatus an image processing apparatus that can generate, relative to image data for a first color space having a predetermined characteristic, optimal image reproduction data for a second color space without any deterioration in image quality, and to provide an electrophotographic apparatus that uses this image processing apparatus.

To achieve the above objective, according to one aspect of the invention, provided is an image processing apparatus wherein input tone data for a first color space are converted into tone data for a second color space and a halftone process is performed to convert the tone data for the second color space into image reproduction data, and wherein a gamma characteristic A for an output density relative to the tone of the first color space is equalized with a gamma characteristic B for an output density relative to the tone of the second color space in the halftone process.

According to the invention, during the color conversion, even when the tone data for the first color space between grid points in a color conversion table are obtained by interpolating the tone data for the second color space, the halftone process is performed for the obtained tone data in accordance with the same gamma characteristic B. Thus, image reproduction data can be generated that reproduce the same output density as the output density allocated for the tone data for the first color space. Therefore, when the image reproduction data are employed for printing, the colors of an image can be accurately reproduced, as designed, and an image having a high quality can be printed.

Specifically, in this invention, the gamma characteristic A for color conversion and the gamma characteristic B for the halftone process are correlated or are relevant to each other. That is, when the gamma characteristic A represents a concave or a convex characteristic, accordingly, the gamma characteristic B represents the same characteristic. Thus, as is described above, the gamma characteristic B depends on the gamma characteristic A.

In this invention, as one preferred embodiment, the gama characteristic A and the gamma characteristic B are non-linear characteristics. In another preferred embodiment, for the gamma characteristic A the difference between the ratio for a change in the output density to the input tone for a bright image area and the ratio for a change in the output density to the input tone for a dark image area is the same as the difference between these ratios for the gamma characteristic B.

In these embodiments, the gamma characteristic A, which represents the relationship between the tone of image data for the first color space and the output density, and the gamma characteristic B, which represents the relationship between the tone of image data for the second color space in the halftone process and the image reproduction data relative to the output density, represent the same non-linear characteristics. Therefore, when the image reproduction data for a design are employed, a high quality, accurately reproduced image can be printed.

In addition, to achieve the above objective, according to another aspect of the invention, an image processing apparatus, which uses input tone data for a first color space image to generate reproduction data that express a halftone for an image, comprises:

a color converter, for performing an interpolation process, for referring to a color conversion table to convert the input tone data for the first color space into tone data for a second color space; and a halftone processor for converting the tone data for the second color space into image reproduction data, by referring to a halftone table that shows the correlation of the tone data for the second color space and the image reproduction data, wherein a gamma characteristic A, for the input tone data for the first color space, for an output density relative to a tone value for each brightness level of an image corresponds to a gamma characteristic B, for the halftone table, for an output density relative to a tone value for each brightness level of an image.

Features and advantages of the invention will be evident from the following detailed description of the preferred embodiments described in conjunction with the attached drawings.

DETAILED DESCRIPTION OF THE PREFERRED EMBODIMENTS

The preferred embodiment of the invention will now be described while referring to the accompanying drawings. However, the technical scope of the invention is not limited to this embodiment. The invention can be applied for various first and second color spaces, and in the following explanation, as an example, an image processing apparatus is employed that generates, using image data for an RGB color space that constitutes the CRT characteristic, image reproduction data for a CMYK color space of a page printer.

Figure 1:
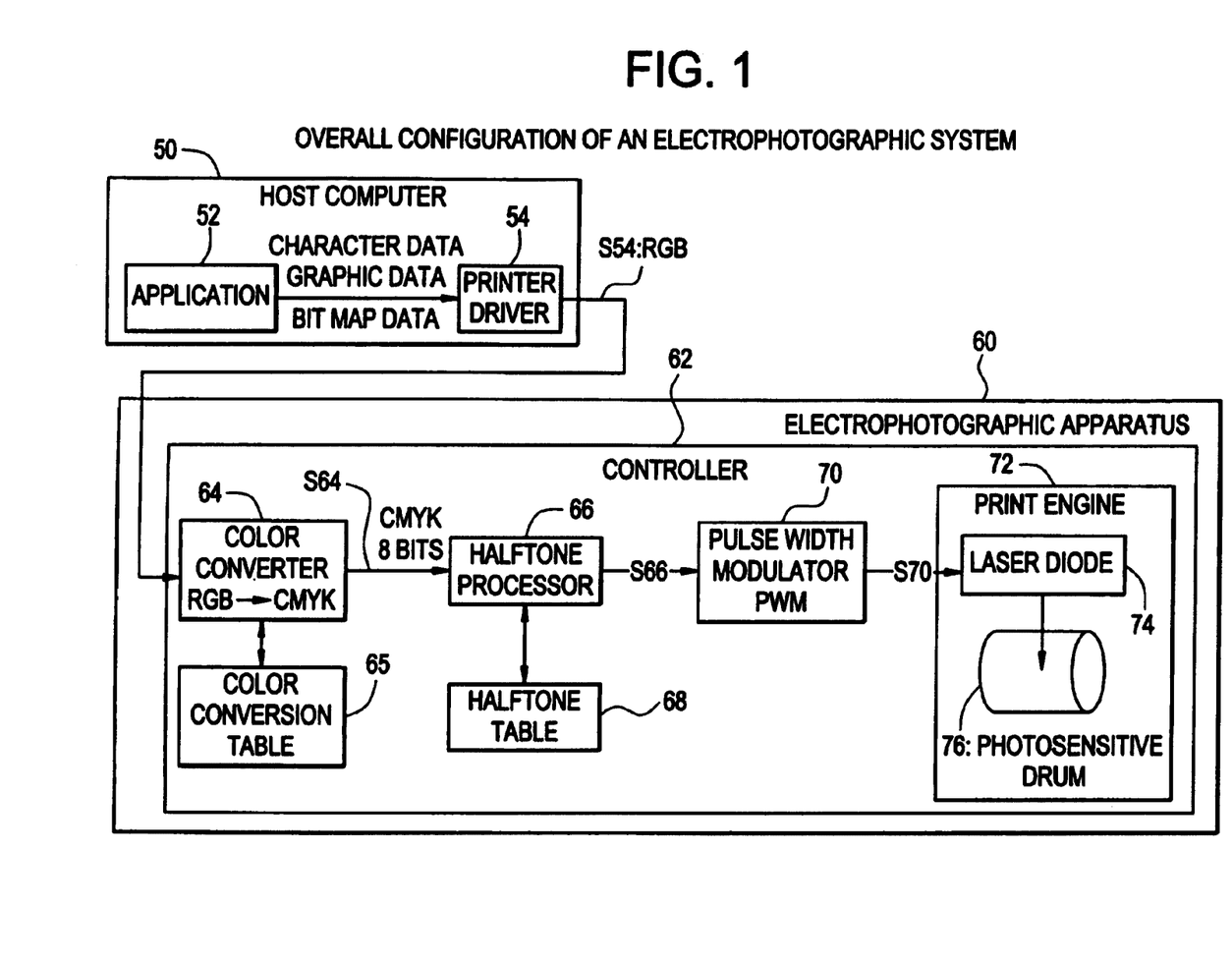
FIG. 1 is a diagram illustrating an electrophotographic printing system according to one embodiment.

FIG. 1 is a diagram showing the configuration of an electrophotographic printing system according to this embodiment. In this embodiment, a host computer 50 generates image data S54, consisting of RGB tone data (8 bits each, for a total of 24 bits) for the first color space, that it transmits to an electrophotographic apparatus 60, a page printer.

The electrophotographic apparatus 60, such as a page printer, converts the received image data S54 into the CMYK tone data for the second color space, and employs toner for this color space that will reproduce a color image. The electrophotographic apparatus 60 includes a controller 62, for performing image processing and for transmitting a laser drive pulse signal S70 to a print engine 72, which reproduces an image upon the receipt of the drive pulse signal S70.

In the host computer 50, character data, graphic data or bit map data are generated by an application program 52, such as a word processor or a graphic tool. The data generated by the application program 52 are rasterized by an electrophotographic apparatus driver 54 that is installed in the host computer 50, and image data S54 is obtained that consists of tone data for individual RGB colors for each pixel.

An image is so designed using computer graphics on a computer monitor screen, such as a CRT, that optimal image quality or colors are obtained. Therefore, the RGB image data S54, generated using computer graphics, conforms to the gamma characteristic of the output density relative to the tone of the CRT. The gamma characteristic is as shown in FIG. 10, for example. In an area corresponding to a bright image, i.e., an area wherein an input tone value x is large, the ratio of the change in the output density to the change in the input tone value is small, and in an area corresponding to a dark image, i.e., an area wherein the input tone value x is low, the ratio of the change in the output density to the change in the input tone value is large. Of course, for another monitor device, a different gamma characteristic may be employed.

A microprocessor (not shown) is incorporated in the electrophotographic apparatus 60, and together, the microprocessor and an installed control program constitute a controller 62, which includes a color converter 64, a halftone processor 66 and a pulse width modulator 70. In the print engine 72, a laser diode 74 for drawing images, driven in accordance with the drive pulse signal S70, irradiates a photosensitive drum 67 and forms thereon latent images to which CYMK toners are sequentially attached. Subsequently, the superimposed toner images are transferred to a transfer drum (not shown) and printed.

The color converter 64 in the controller 62 converts the RGB tone data S54 for each pixel into tone data S64 for CMYK colors that are complementary to the RGB colors. This color conversion process is performed by referring to a color conversion table 65 wherein the correlation between RGB tone data combinations and CMYK tone data combinations is represented.

When the RGB tone data for each color is 8 bits wide, and thus represents 256 tones, there are $256^3 = 16700000$ (16700000 colors) RGB tone data combinations. Therefore, were all the combinations of CMYK tone data for all the 1670000 sets of RGB tone data be entered in the color conversion table 65, the amount of data that would have to be stored (67 Mbytes) would be enormous. Since this is not realistic, of the 16700000 colors, the color conversation table 65 includes CMYK conversion values for grid points for from several hundreds of colors to several tens of thousands. When the input RGB tone data represents a value lying between two grid points, interpolation using the adjacent grid points, e.g., linear interpolation, is performed to obtain the corresponding CMYK tone data S64.

The CMYK tone data S64 for each color are also 8 bits wide, and thus, for each color a maximum of 256 tones can be represented. The color converter 64 converts the RGB tone data S54 for each pixel into the tone data S64 for each pixel in the planes of individual CMYK colors, and transmits the tone data S64-to the halftone processor 66.

For the CMYK tone data S64 for each dot, the halftone processor 66 refers to a halftone table (gamma table) 68, which is prepared in advance and which represents the correlation between tone data and image reproduction data, to generate image reproduction data S66 for each pixel. The image reproduction data S66 are drive pulse data representing a beam irradiated area in a pixel wherein tones for individual CMYK colors are attached. The drive pulse data S66, i.e., the image reproduction data, are transmitted to the pulse width modulator 70, which in turn generates the drive pulse signal S70.

In this embodiment, when the halftone processor 66 employs a multi-level dithering method, more tones having a higher resolution can be reproduced while using a low dot density, such as 600 dpi, for a color printer.

Figure 2:
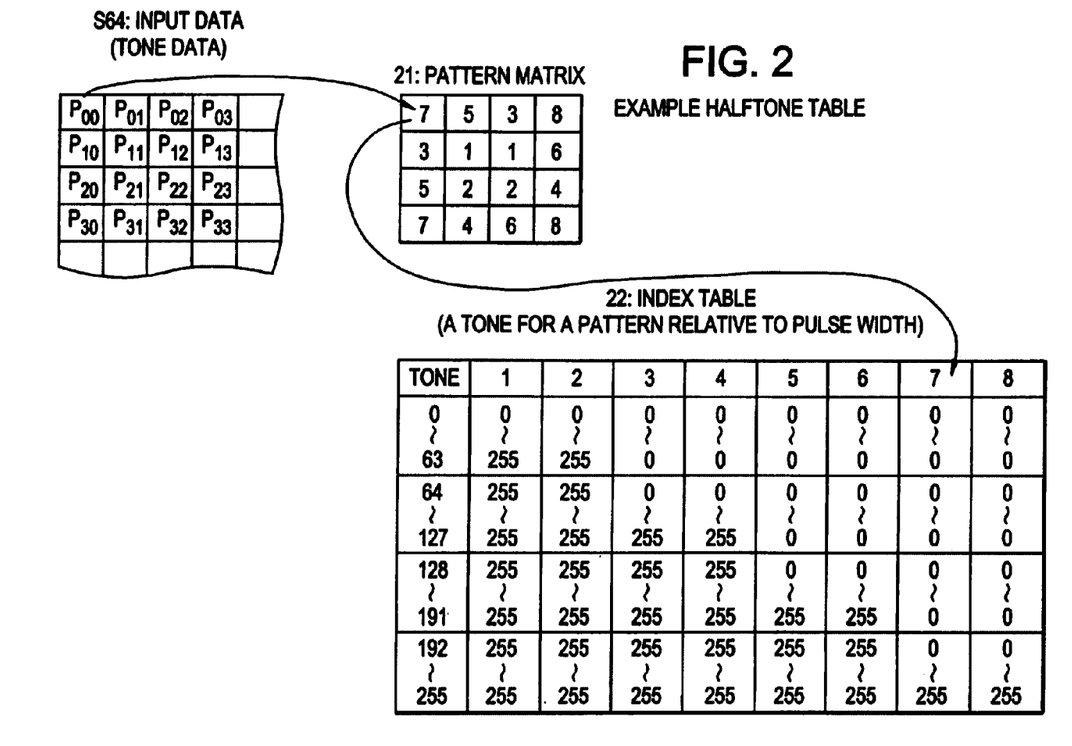
FIG. 2 is a diagram showing a halftone table (gamma table) for a multi-level dithering method according to the embodiment.

FIG. 2 is a diagram showing an example halftone table (gamma table) according to a multi-level dithering method employed for the embodiment. According to the multi-level dithering method, the halftone table is examined for the input data S64, which consist of tone data for each pixel, and image reproduction data is output. For example, to obtain pulse width data corresponding to the tone data for a pixel P00, in a pattern matrix 21 a corresponding pattern-number "7" is referred to, and in an index table 22, in which the correlation of tones and laser drive pulses is represented, a column "7" corresponding to the pattern number "7", is referred to. In this manner, the pattern matrix 21 and the index table 22 constitute a halftone table (gamma table) 68 in which the correlation of tone data and image reproduction data is represented.

When not only binary image reproduction data are employed that indicate whether or not a pixel is to be irradiated by a laser beam, but also multi-level image reproduction data that indicate the range of the laser beam irradiation that is to be performed in the pixel, a density modulated image having more tones can be reproduced. The halftone processor 66 employs the multi-level dithering method that uses this function to generate, as the image reproduction data S66 for each pixel, laser beam drive pulse width data.

By using data indicating whether or not a laser beam should be emitted, an electrophotographic apparatus, such as a page printer, can emit a beam that strikes only a part of the area of a pixel in the scanning direction, while scanning with a laser beam in the direction (main scanning direction) perpendicular to the paper feeding direction. Therefore, when 256 kinds of laser drive pulses are employed, 256 latent images can be formed in a pixel in the scanning direction.

As shown in FIG. 2, eight patterns are arranged in the pattern matrix 21, and 256 pulse widths, corresponding to 256 tones, are entered in the index table 22. Further, for the eight patterns correlation of the tones and the pulse widths differ. In the example in FIG. 2, for patterns 1 and 2 in the index table 22, pulse widths 0 to 255 are correlated with tones 0 to 63, and the pulse width 255 (emitted beams that strike a dot) is correlated with tones 64 to 255. Therefore, patterns 1 and 2 form dots that grow even at a comparatively low tone value. In addition, according to the example in FIG. 2, patterns 3 and 4 in the index table 22, pulse width 0 is correlated with tones 0 to 63, and pulse widths 0 to 255 are correlated with tones 64 to 127, while pulse width 255 is correlated with the higher tones, 128 to 255. Therefore, the patterns 3 and 4 form printing dots in a halftone spot that grows at a tone value higher than that for the patterns 1 and 2.

Similarly, for patterns 5 and 6 in the index table 22, pulse width 0 is correlated with tones 0 to 127, pulse widths 0 to 255 are correlated with tones 128 to 191, and pulse width 255 is correlated with the higher tones, 192 to 255. Finally, for patterns 7 and 8 in the index table 22, pulse width 0 is correlated with tones 0 to 191, and pulse widths 0 to 255 are correlated with tones 192 to 255. Therefore, the patterns 5 and 6 correspond to dots that grow more slowly than the increase in the tone, and patterns 7 and 8 correspond to dots that grow the slowest.

A cell area for forming a halftone spot consists of a plurality of pixels. When toner is attached to pixel areas that are designated by the image reproduction data, sets of dots are formed in pixels that collectively are used to form a halftone spot.

Figure 3:
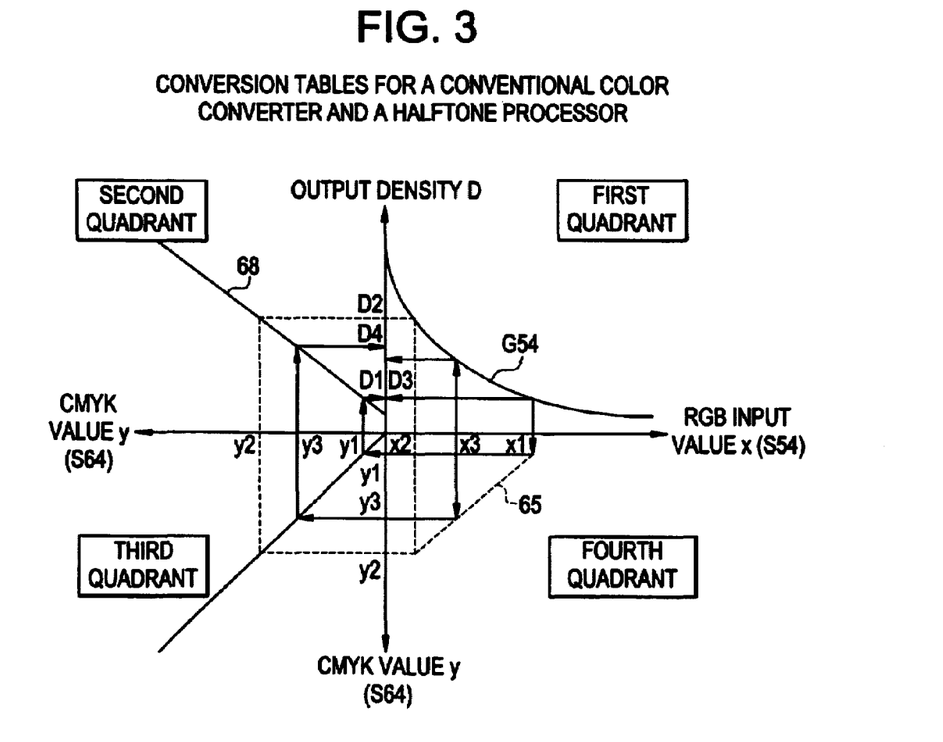
FIG. 3 is a graph showing conversion tables for a conventional color converter and a halftone processor.
Figure 4:
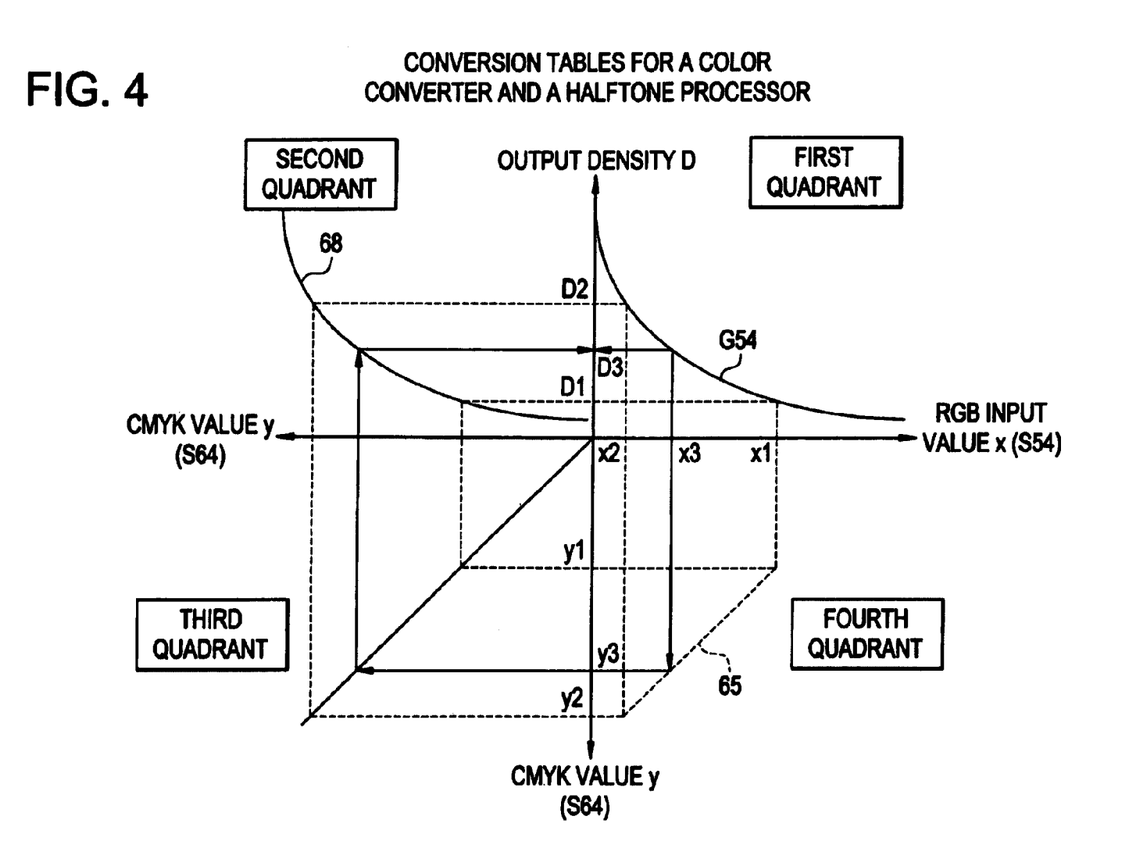
FIG. 4 is a graph, in accordance with the embodiment, showing conversion tables for a color converter and a halftone processor for image data on a CRT screen.

FIGS. 3 and 4 are graphs showing the conversion tables for the conventional color converter for the halftone processor and for this embodiment. The advantages afforded by this embodiment can be elucidated by comparing these graphs. Note that the same reference numbers are used for both graphs.

In FIGS. 3 and 4, in the first quadrant, a gamma characteristic curve G54 is shown that represents the relationship between the RGB tone data S54 and the output density D on the monitor screen. The horizontal axis x in the first quadrant represents the RGB tone data S54, and the vertical axis y represents the output density D on the monitor screen. It should be noted that the output density D on the monitor screen is obtained using the above method by converting the output luminance on the monitor screen to provide an equivalent density. The characteristic of the gamma characteristic curve G54 is that the ratio of the change of the output density D to the change of an input tone is small in a comparatively bright portion of an image, while it is large in a comparatively dark portion of the image. In the graphs, D1, D2 and D3 represent desired output densities D for RGB tone values x1, x2 and x3, i.e., target reproduced densities.

In the second quadrant is shown the characteristic curve for the halftone table (gamma table) 68 of the halftone processor. According to the halftone table 68, the input CMYK tone data S64 along the horizontal axis x (in the negative direction) is converted into the image reproduction data S66 that corresponds to the output density D along the vertical axis y. It should be noted, however, that, strictly speaking, the characteristic curve 68 also includes a print engine characteristic and does not represent the relationship with the value of the laser drive pulse width that is used to generate the output density D.

The third quadrant simply shows a returning portion, and the negative direction along the horizontal axis x corresponds to the negative direction of the vertical axis y. Therefore, the CMYK tone data obtained by color conversion also correspond to the vertical axis y (in the negative direction).

A color table curve 65 for the color converter is shown in the fourth quadrant. The horizontal axis x represents the input RGB tone data S54, and the vertical axis y represents the CMYK tone data S64 obtained by the color conversion.

The color conversion table 65 is generated in the following manner. For the RGB input value x1, the output density D1 is defined in accordance with the device characteristic of the CRT monitor. Thus, the CMYK value y1, which can generate the output density D1, is obtained in accordance with the halftone table characteristic in the second quadrant. After the characteristic curve is returned in the third quadrant, the intersection of the CMYK value y1 and the input RGB value x1 is determined to be a value for the conversion table 65. Similarly, the intersection of the input RGB value x2 and the CMYK value y2 is determined to be a value for the conversion table 65. The input value x that is thus discretely obtained and the conversion value y that is obtained using the above method constitute the conversion table 65. As previously explained, the conversion table 65 does not include the conversion values y for all the input RGB values x, but does include conversion values for the discrete input points, such as x1 and x2.

The conversion table 65 in the fourth quadrant in FIG. 3 shows the relationship between the RGB and the CMYK tone values. That is, when a RGB tone value is increased, the image is brightened and when a CMYK value is increased, the image is darkened. Therefore, the high RGB tone data for a bright image correspond to the low CMYK tone data, and the low RGB tone data for a dark image correspond to the high CMYk tone data.

The color conversion table 65 includes only the correlation of discrete grid points, such as x1 or x2 and y1 or y2. Thus, the CMYK tone data y3, which correspond to the intermediate input data x3, are obtained by linear interpolation.

As is shown in FIG. 3, for the conventional halftone table 68 the gamma characteristic is represented by a simple, linearly increasing procedure. Thus, an explanation will first be given for the image processing for the RGB tone data x1 and x2, which are grid points in the color conversion table. According to the color conversion table 65 in the fourth quadrant, the RGB tone data x1 and x2 are converted into the CMYK tone values y1 and y2, and the lines for the CMYK tone values y1 and y2 are returned in the third quadrant and converted into the image reproduction data S66 that correspond to the output densities D1 and D2, in accordance with the halftone table 68 in the second quadrant. It can be understood from the first quadrant that the target reproduction densities for the RGB tone data x1 and x2 are D1 and D2, and that these obtained output densities match the target densities. This is true because, as is explained above, when the color conversion table is prepared the grid points are so set that they correlate.

An explanation will now be given for the image processing for the RGB tone data x3 between the RGB tone data x1 and x2, which are grid points in the color conversion table.

As is apparent from the first quadrant, the target reproduction density of the RGB tone data x3 is D3. Since the value x3 does not correspond to the grid point x1 or x2 in the color conversion table 65 in the fourth quadrant, the CMYK tone data y3 is obtained from the intersection of x=x3 and a line connecting the grid points (x1,y1) and (x2,y2). That is, the CMYK tone value y3 is obtained by linear interpolation. The line for this value y3 is returned in the third quadrant, and in accordance with the halftone table 68 in the second quadrant, the value y3 is converted into the image reproduction data S66, which corresponds to the output density D4 that differs from the target reproduction density D3.

In the example in FIG. 3, the output density D4 is higher than the target reproduction density D3. Thus, a bright image on the CRT screen is printed as a darker image.

On the other hand, the gamma characteristic of the halftone table 68 for this embodiment in FIG. 4 is the same as the gamma characteristic G54 for the output density of the RGB tone value. That is, the ratio of the change of the output density to the change of the input tone value is small in the bright portion of an image, and is large in the dark portion of an image, i.e., a portion having a high CMYK tone value. This, relative to the RGB tone value, is equal to the characteristic for the output density in the first quadrant.

As a result, the halftone processor 66 for this embodiment, which performs color conversion using the halftone table 68 in FIG. 4, can generate for the CMYK tone value y3 the image reproduction data S66 that corresponds to the ideal output density D3. Specifically, in accordance with the conversion table 65 in the second quadrant, the image processing apparatus in this embodiment performs linear interpolation, using the grid points x1 and x2, to perform color conversion for the RGB tone data x3, which corresponds to the target reproduction density D3, in order to generate the CMYK tone data y3. Further, the image processing apparatus performs the halftone process by examining the halftone table 68 in the fourth quadrant, and converts the CMYK tone data y3 into the image reproduction data S66 that corresponds to the target reproduction density D3.

When there are 256 CMYK values, in the halftone table 68 all of these tones and output image reproduction data are correlated. Therefore, the halftone processor 66 does not perform linear interpolation.

As is shown in FIG. 4, since relative to the RGB tone value, which is the first color space, the shape of the gamma characteristic G54 of the output density D is concave, accordingly, the characteristic of the conversion table (gamma table) 68 of the halftone processor 66 is also concave. When relative to the RGB tone value, which is the first color space, the gamma characteristic G54 of the output density D is convex, accordingly, the characteristic of the conversion table (gamma table) 68 of the halftone processor 66 must also be convex. Further, when relative to the RGB tone value, which that is the first color space, the gamma characteristic G54 of the output density D is S-shaped, accordingly, the characteristic of the conversion table (gamma table) 68 of the halftone processor 66 must also be S-shaped.

As is described above, in this embodiment, since the gamma characteristic of the conversion table (gamma table) 68 of the halftone processor 66 matches the gamma characteristic relative to the output density of the RGB tone data, the image processing apparatus can generate the image reproduction data S66 that corresponds to the conventional target reproduction density. Therefore, when the image reproduction data S66 is employed to print an image, the image, as designed on the CRT screen, can be printed accurately, and the image quality can be improved.

Figure 5:
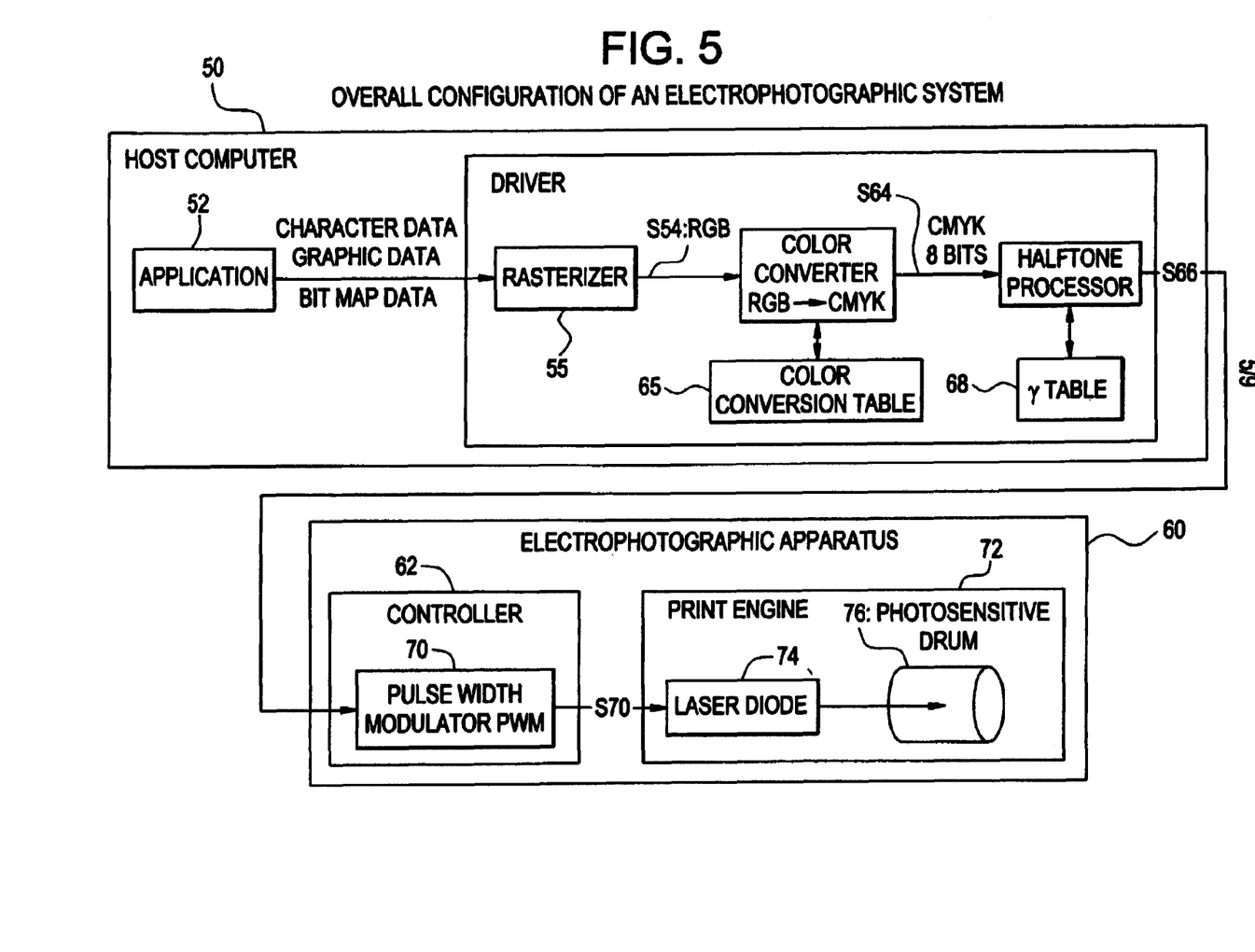
FIG. 5 is a diagram showing another configuration for the electrophotographic printing system.

FIG. 5 is a diagram showing another configuration for the electrophotographic printing system. This system is a modified example of the system shown in FIG. 1. In this system, a driver 54 which is installed in a host computer 50 includes a rasterizer 55, a color converter 64 and a halftone processor 66. These 55, 64, 66 have the same function as 54, 64, 66 shown in FIG. 1. An image reproduction data (pulse width data) S66 for each color generated by the halftone processor is supplied to a pulse width modulator 70 in a controller 62 in a electrophotographic apparatus 60 such as a page printer etc., converted to a drive pulse signal S70, and then given to a print engine 72.

In a system shown in FIG. 5, a driver 54, which is installed in a host computer, performs the color conversion process and the halftone process. While in the example in FIG. 1 these processes are performed by the controller of the electrophotographic apparatus, in the example in FIG. 5 the processes are performed by a host computer 50. When a reduction in the price of an electrophotographic apparatus 60 is requested, to reduce the price, the function provided by the controller 60 must also be reduced. In this case, an effective procedure is for a drive program installed in the host computer 50 to perform a part of the function of the controller in FIG. 1. Then, when the driver 54 implements the halftone process, a storage medium on which a program is stored that permits the computer to perform the above described halftone process is incorporated in the host computer 50. [Another combination of the first color space and the second color space]

The first color space can be an RGB color space optimized using the characteristic of a liquid crystal display, an RGB color space optimized using the characteristic of a scanner or a digital camera, an sRGB color space recommended for windows®, or a CIELab or CIEXYZ color space that is device independent. In any case, a specific gamma characteristic is present between the tone value and the output density. It should be noted that CIE represents the International Commission on Illumination (Commission Internationale de l'Eclairage) and that it was in 1931 that the gamma characteristic, according to which absolute values are used to express colors that a human being can visually perceive, was defined.

The second color space can be a CMYK color space for the toner of a laser printer, also called a page printer, a CMYK color ink space for an ink-jet printer, a color space for six colors, CCMMYK (C and M include light colors), a color space for seven colors, CCMMYYK (C, M and Y include light colors), a color space for seven colors, CCMMYKK (C, M and K include light colors), or a CMYKRGB color space for seven-color printing using the ordinary CMYK and RGB inks.

The RGB, CIEXYZ and L* of CIELab are color spaces for the additive mixture of color stimuli whereby an image is darker at a low tone value or is brighter at a high tone value. The CMYK is a color space for the subtractive mixture of color stimuli whereby an image is brighter at a low tone value or is darker at a high tone value.

Figure 6:
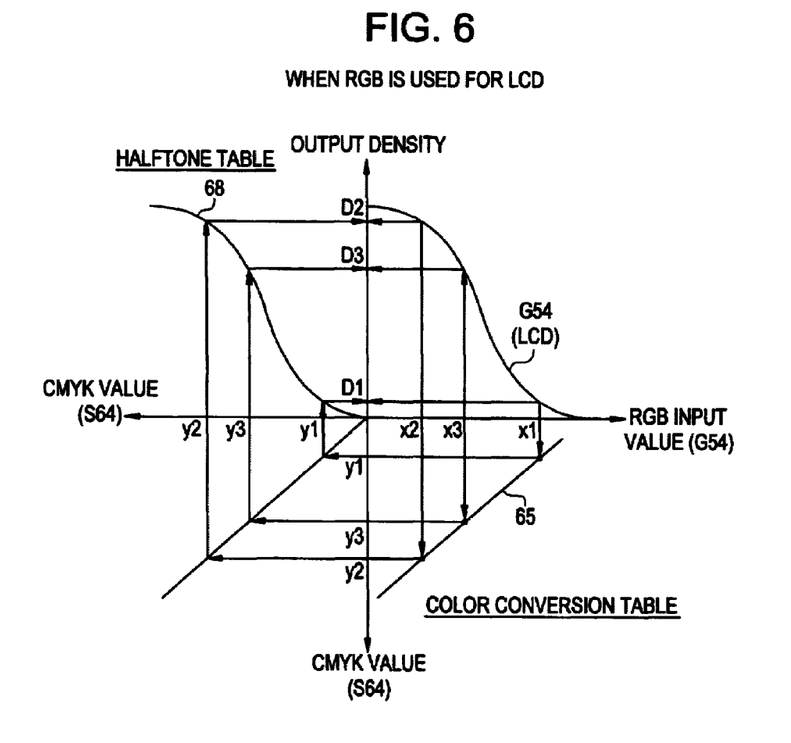
FIG. 6 is a graph, in accordance with the embodiment, showing conversion tables for the color converter and the halftone processor for image data on a liquid crystal display.

FIG. 6 is a graph showing the conversion tables for the color converter and the halftone processor of an image processing apparatus that converts image data, for an RGB color space generated on the liquid crystal screen, into image reproduction data, which are used for an electrophotographic apparatus that employs CMYK toner. The graph in FIG. 6 is associated with the one in FIG. 4.

As is shown in the first quadrant in FIG. 6, the device characteristic (gamma characteristic) of the liquid crystal display has an S-curve shape. That is, the change in the output density is small in the low RGB tone area, is large in the intermediate RGB tone area, and is small in the high RGB tone area. Accordingly, in this embodiment, the gamma characteristic of the halftone table 68 also has an S-curve shape. That is, the change in the output density is small in the high CMYK tone area, is large in the intermediate RGB tone area, and is small in the low RGB tone area.

Since RGB is an additive mixture of color stimuli and CMYK is a subtractive mixture of color stimuli, the input tone values are inverted. However, for the relationship between the input tone value and the output density for each brightness level of the image, for both color spaces the gamma characteristic is the same.

In the example in FIG. 6, as in FIG. 4, the output density D of the image reproduction data, which is obtained by the conversion of the colors for the input x3, between the sampling points (x1, y1) and (x2, y2) for the color conversion table 65, is the same as the output density D3 on the liquid crystal display. Therefore, the colors shown on the liquid crystal display are printed unchanged.

Figure 7:
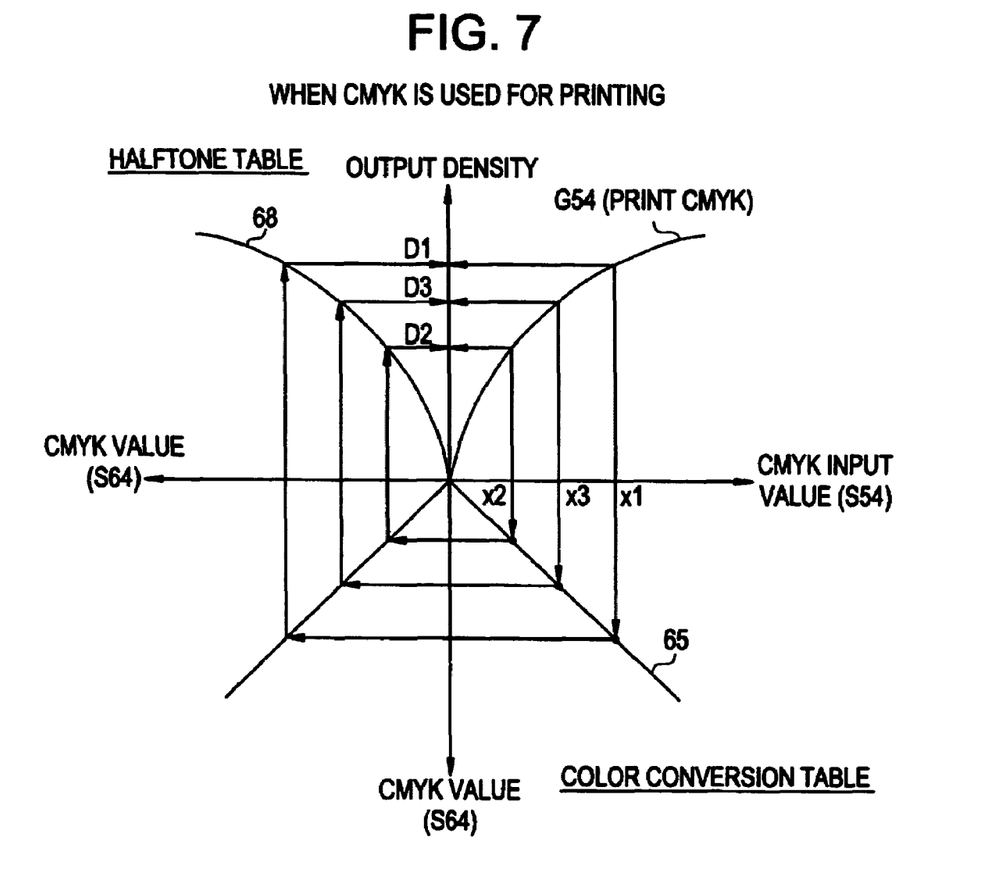
FIG. 7 is a graph, in accordance with the embodiment, showing conversion tables for the color converter and the halftone processor for CMYK image data used for printing.

FIG. 7 is a graph showing the color conversion table and the halftone table for the CMYK image data generated for printing. The CMYK image data generated for printing represent the size (%) of the halftone spots. As is shown in the first quadrant in FIG. 7, the change in the output density is large in the low CMYK tone area and is small in the high tone area, i.e., the gamma characteristic has a convex shape. Thus, in this embodiment, the gamma characteristic of the halftone table 68 also has a convex shape, i.e., the change in the output density is large in the low CMYK tone area and is small in the high tone area.

In this case, the image reproduction data for the output density D3 can be generated for the input CMYK value x3 located between the sample points in the conversion table 65, and the colors of the image data generated for printing can be accurately reproduced by the electrophotographic apparatus.

Figure 8:
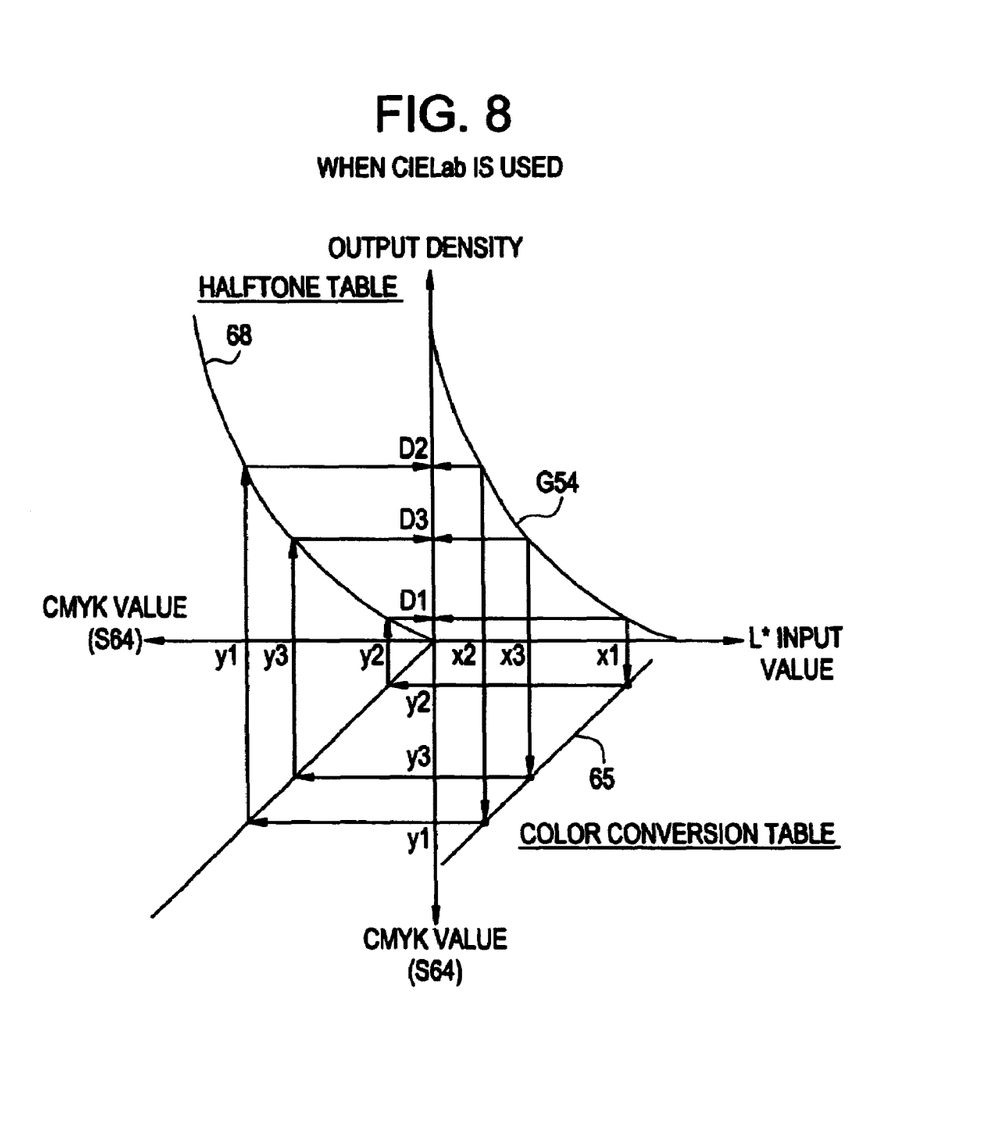
FIG. 8 is a graph, in accordance with the embodiment, showing conversion tables for the color converter and the halftone processor for L*, CIELab image data.

FIG. 8 is a graph showing the color conversion table and the halftone table for the L* of CIELab color space that is device independent. The L* of the CIELab is data representing brightness, the a* is data in the red-green direction, and the b* is data in the blue-yellow direction. The relationship between the brightness L* and the CMYK image data of the laser printer can be shown as in FIG. 8.

The gamma characteristic of the brightness L* has a concave shape wherein the change of the output density is large in the dark portion of an image at a low input tone value, and is small in the bright portion at a high input tone value. Accordingly, the gamma characteristic of the halftone table 68 has a concave shape wherein the change in the output density is large in the dark portion of an image at a high input tone value, and is small in the bright portion at a low input tone value. This relationship is similar to that shown in FIG. 4.

As is shown in FIG. 8, the image reproduction data for the output density D3 can be produced for the input L* value x3 located between the sample points in the color conversion table 65, and an image having the brightness indicated by the L* of the DIELab, which is device independent, can be reproduced by the electrophotographic apparatus.

The protective scope of the invention is not limited to this embodiment, and covers the invention as cited in the claims and is the equivalent of the invention.

In conclusion, according to the invention, an image can be printed while the colors of the image, as designed on the screen of a computer, are maintained to the extent possible.

What is claimed is:

1. An image processing apparatus, which uses input tone data for a first color space image to generate reproduction data that express a halftone for an image, comprising:
   a color converter, for performing an interpolation process, for referring to a color conversion table to convert said input tone data for said first color space into tone data for a second color space; and
   a halftone processor for converting said tone data for said second color space into image reproduction data, by referring to a halftone table that shows the correlation of said tone data for said second color space and said image reproduction data,
   wherein a gamma characteristic A, for said input tone data for said first color space and an output density relative to a tone value for each brightness level of an image, corresponds to a gamma characteristic B for said halftone table and an output density relative to a tone value for each brightness level of an image.

2. The image processing apparatus according to claim 1, wherein said first color space is a color space for an additive mixture of color stimuli, and said second color space is a color space for a subtractive mixture of color stimuli; and wherein a difference, for said gamma characteristic A, between a ratio for a first input tone area of the change of said output density to the change of a first input tone value, and a ratio for a second input tone area of the change of said output density to the change of a second input tone value, which is lower than said first input tone value for said first input tone area, is the same as a difference, for said gamma characteristic B, between a ratio for a third input tone area of the change of said output density to the change of a third input tone value, and a ratio for a fourth input tone area of the change of said output density to the change of a fourth input tone value, which is higher than said third input tone value for said third input tone area.

3. The image processing apparatus according to claim 1, wherein said first color space is a color space for a subtractive mixture of color stimuli, and said second color space is a color space for a subtractive mixture of color stimuli; and wherein a difference, for said gamma characteristic A, between a ratio for a first input tone area of the change of said output density to the change of a first input tone value, and a ratio for a second input tone area of the change of said output density to the change of a second input tone value, which is lower than said first input tone value for said first input tone area, is the same as a difference, for said gamma characteristic B, between a ratio for a third input tone area of the change of said output density to the change of a third input tone value, and a ratio for a fourth input tone area of the change of said output density to the change of a fourth input tone value, which is lower than said third input tone value for said third input tone area.

4. An image processing apparatus according to claim 2, wherein said color space for said additive mixture of color stimuli is either an RGB color space, an sRGB color space, a CIEXYZ color space or a CIELab color space, and said color space for said subtractive mixture of color stimuli is a CMYK color space.

5. An image processing apparatus according to claim 3, wherein said color space for said subtractive mixture of color stimuli is a CMYK color space.

6. The image processing apparatus according to claim 1, wherein said first color space is either an RGB, an sRGB or a CIELab color space, and said second color space is a CMYK color space; wherein, for said gamma characteristic A, a ratio in a first input tone area for the change in said output density to the change in a first input tone value is smaller than a ratio in a second input tone area for the change in said output density to the change in a second input tone value, which is lower than said first input tone value in said first input tone area; and wherein, for said gamma characteristic B, a ratio in a third input tone area for the change in said output density to the change in a third input tone value is greater than a ratio in a fourth input tone area for the change in said output density to the change in a fourth input tone value, which is lower than said input tone value in said third input tone area.

7. The image processing apparatus according to claim 1, wherein said first color space is a first CMYK color space, and said second color space is a second CMYK color space; wherein, for said gamma characteristic A, a ratio in a first input tone area for the change in said output density to the change in a first input tone value is smaller than a ratio in a second input tone area for the change in said output density to the change in a second input tone value, which is lower than said first input tone value in said first input tone area; and wherein, for said gamma characteristic B, a ratio in a third input tone area for the change in said output density to the change in a third input tone value is smaller than a ratio in a fourth input tone area for the change in said output density to the change in a fourth input tone value, which is lower than said input tone value in said third input tone area.

8. An image processing apparatus according to claim 1, wherein said gamma characteristic A and said gamma characteristic B have the same non-linear characteristic.

9. An image processing apparatus according to claim 1, wherein said gamma characteristic A and said gamma characteristic B have the same S-shaped characteristic.

10. The image processing apparatus according to claim 1, wherein said first color space is a CIELab color space and said second color space is a CMYK color space, and wherein a gamma characteristic of L* in said first color space is the same as a gamma characteristic of L* said halftone table.

11. An image processing apparatus according to claim 1, wherein said first color space is a CIELab color space or a CIEXYZ color space, and said second color space is a CMYK color space.

12. An image processing apparatus according to claim 1, wherein said color conversion table includes a discrete relationship between said input tone data for said first color space and said tone data for said second color space; and wherein said halftone table includes a continuous relationship between said input tone data for said first color space and said tone data for said second color space.

13. The image processing apparatus for generating, using input tone data for an RGB color space, image reproduction data that express tones by using a plurality of printing dots comprising:
  a color converter, for performing an interpolation process, for referring to a color conversion table to convert said input tone data for said RGB color space into tone data for a CMYK color space; and
  a halftone processor for converting said tone data for said second color space into image reproduction data, by referring to a halftone table that shows the correlation of said tone data for said CMYK color space and said image reproduction data,
  wherein, for a gamma characteristic A for an output density relative to a tone value of said input tone data for said RGB color space, a difference between a ratio for a first RGB tone area of the change of said output density to the change of a first input tone value, and a ratio for a second RGB tone area of the change of said output density to the change of second input tone value, which is lower than said first input tone value for said first input tone area, is the same as a difference, for said gamma characteristic B of said halftone table, between a ratio for a first CMYK input tone area of the change of said output density to the change of a third input tone value, and a ratio for a second CMYK input tone area of the change of said output density to the change of a fourth input tone value, which is higher than said third input tone value for said first CMYK input tone area.

14. An electrophotographic apparatus comprising:
an image processing apparatus according to claim 1; and
a print engine for printing an image in accordance with image reproduction data.

15. An electrophotographic apparatus comprising:
an image processing apparatus according to claim 13; and
a print engine for printing an image in accordance with image reproduction data.

16. The electrophotographic apparatus according to claim 14, wherein said print engine emits a laser beam in accordance with said image reproduction data to form a latent image, and attaches toner for a color space to said latent image.

17. The electrophotographic apparatus according to claim 15, wherein said print engine emits a laser beam in accordance with said image reproduction data to form a latent image, and attaches toner for a color space to said latent image.

18. A recording medium for storing an image processing program that permits a computer to perform image processing for generating, using input tone data for a first color space, image reproduction data that express image halftones, said image processing comprising:
  a color conversion process, for performing an interpolation process, for referring to a color conversion table to convert said input tone data for said first color space into tone data for a second color space; and
  a halftone process for converting said tone data for said second color space into image reproduction data, by referring to a halftone table that shows the correlation of said tone data for said second color space and said image reproduction data,
  wherein a gamma characteristic A, for said input tone data for said first color space, for an output density relative to a first tone value for each brightness level of an image corresponds to a gamma characteristic B, for said halftone table, for an output density relative to a second tone value for each brightness level of an image.

19. A recording medium for storing an image processing program that permits a computer to perform image processing for generating, using input tone data for an RGB color space, image reproduction data that express tones by using a plurality of printing dots, said image processing comprising:
  a color conversion process, for performing an interpolation process, for referring to a color conversion table to convert said input tone data for said RGB color space into tone data for a CMYK color space; and
  a halftone process for converting said tone data for a second color space into image reproduction data, by referring to a halftone table that shows the correlation of said tone data for said CMYK color space and said image reproduction data, wherein, for a gamma characteristic A for an output density relative to a tone value of said input tone data for said RGB color space, a difference between a ratio for a first RGB tone area of the change of said output density to the change of a first input tone value, and a ratio for a second RGB tone area of the change of said output density to the change of a second input tone value, which is lower than said first input tone value for said first input tone area, is the same as a difference, for a gamma characteristic B of said halftone table, between a ratio for a first CMYK input tone area of the change of said output density to the change of a third input tone value, and a ratio for a second CMYK input tone area of the change of said output density to the change of a fourth input tone value, which is higher than said third input tone value for said first CMYK input tone area.

* * * * *